United States Patent Office 3,450,819
Patented June 17, 1969

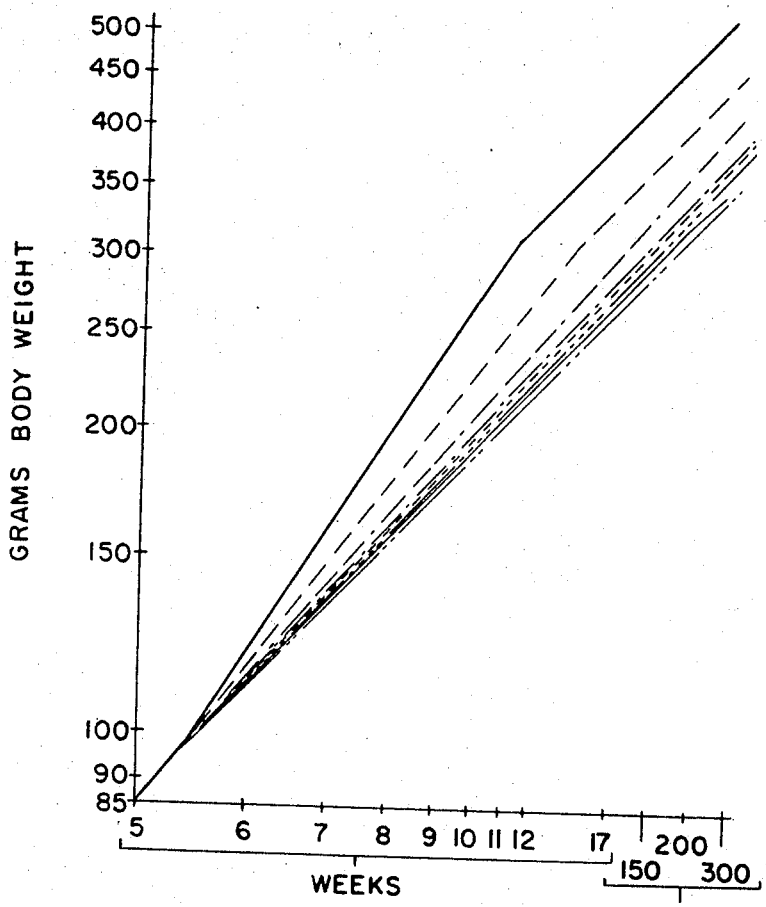

3,450,819
SYNTHETIC THERAPEUTIC FAT
Vigen K. Babayan, Livingston, N.J., and George Barsky, New York, N.Y., assignors to Drew Chemical Corporation, New York, N.Y., a corporation of Delaware
Continuation-in-part of applications Ser. No. 312,769, Sept. 30, 1963, Ser. No. 86,408, Feb. 1, 1961, Ser. 651,901, Apr. 10, 1957, Ser. No. 599,703, July 24, 1956. This application July 12, 1965, Ser. No. 476,777
Int. Cl. A61k 27/00
U.S. Cl. 424—307
16 Claims

ABSTRACT OF THE DISCLOSURE

This invention relates to a novel oil which is the triglyceride of a mixture of 65–95% of caprylic acid, 5–35% of capric acid and 0–5% of caproic and lauric acids, said oil having a setting point below about 0° C. This oil may contain an amount of an essential fatty acid. This oil is particularly useful for people who have difficulty absorbing fats.

---

This invention is directed to synthetic fats or oils for edible purposes and more particularly to a low calorie oil containing essential fatty acids. It is also directed to the treatment, with such synthetic fats or the acids thereof or edible esters thereof, of human beings who suffer from mal absorption of fats, whereby the detrimental effects thereof may be alleviated.

This application is a continuation-in-part of pending application Ser. No. 312,769, filed Sept. 30, 1963 now abandoned which, in turn, is a continuation-in-part of copending application Ser. No. 86,408, filed Feb. 1, 1961, which is a continuation-in-part of co-pending application Ser. No. 651,901, filed Apr. 10, 1957, both now abandoned, the latter, in turn, having been a continuation-in-part of application Ser. No. 599,703, filed July 24, 1956, now Patent No. 2,988,484, issued June 13, 1961. It is also copending with application Ser. No. 265,325, filed Mar. 15, 1963 now abandoned.

In the digestive process in our bodies small amounts of essential fatty acids having at least two double bonds, such as linoleic or arachidonic acids, are required along with fats in order to "trigger" or accelerate the breakdown of fats to assimilable fractions. If it were possible to prepare oils with the required amounts of the essential fatty acids and the balance being other fatty acids which can contribute fuel and energy but have little tendency to deposit in the body tissue as adipose tissue, then we would have an ideal oil for daily usage of many people. Many wish to eat oil and have the feeling of being well fed, enjoy the protective effect of oils which ward off toxic substances in the body and yet not become obese by consuming the oil.

Fats, carbohydrates, and proteins are the three main classes of food substances, with fats constituting the highest caloric intake per unit weight, namely 9.2 calories per gram. It is now well-known that fats are hydrolized and utilized in the intestines. Fat enters the upper intestines and is mixed with bile and pancreatic secretions. The triglyceride is hydrolized into glycerine and fatty acids prior to its absorption from the gut. Other fatty acid esters, specifically phospholipids and cholesterol esters respond to the action of pancreatic lecithinase and cholesterol esterase. It has also been established that from the gut the lymphatic route is generally used for all absorbed fats going to the liver. Alternate pathway for absorption has been suggested and the portal route has been shown to give preferential treatment for fatty acids and glycerides of the shorter chain length.

Malabsorption of fat causes serious dislocation of the normal functions of the body and may result in such diseases as hyperlipemia, chyluria, filariasis, Von Gierke's disease (hepatic glycogenosis), elephantiasis, chylothorax, hypercholesterolemia, pancreatitis, pancreatogenous steatorrhea and proteinuria. They may result in nervous instability and subject the individual to stress or strain. Atherosclerosis or fatty formation on artery walls often results therefrom. Too great a concentration of fat in the blood causes physical weakness.

The present invention is directed to fulfilling the requirements as set forth above and to provide a synthetic fat which is fluid even below 0° C., and which is stable at relatively high temperatures.

It is also among the objects of the present invention to provide a synthetic fat which is digestible and which is adapted to retard increase of body weight when ingested.

It is further among the objects of the present invention to provide a composition which is readily absorbable by the body and which is substantially free from cholesterol.

It is still further among the objects of the present invention to provide a synthetic fat which is capable of decreasing the requirement of the body for essential fatty acids and which is capable of reducing the cholesterol content in the body system.

The present invention is intended to overcome the difficulties and disadvantages resulting from malabsorption, it being among the objects of the invention to treat such persons with the addition to the diet of specially tailored fats of a synthetic nature and to substantially reduce or eliminate the ingestion of the usual fats having the higher fatty acids therein.

One phase of this invention is based upon the premise that saturated fatty acids of chain length below $C_{12}$ when used in mixtures give oils which, when used in conjunction with small amounts of essential fatty acids, not only materially decrease fat deposition in the body tissues but also effect a reduction of serum cholesterol and cholesterol deposition on the artery walls. The cholesterol esters formed from such fatty acid mixtures tend to be different from those formed with saturated fatty acids of longer chain length, such as palmitic or stearic.

The presence of the essential fatty acids may be physical admixtures with the short chain glycerides, but preferably they may be in chemical combination such as synthesized esters. In all cases, however, the beneficial characteristics of both components are utilized for maximum benefit both in nutrition and therapeutic uses. There is strong evidence that not only are these glycerides advantageous as food but also have medicinal and therapeutic advantages in healing and curing of certain ills.

This type of oil is possible by synthesizing oil molecules which incorporate in their composition a small amount of essential fatty acids and the balance being composed of medium chain fatty acids such as caproic, caprylic and capric. The fatty acids from $C_8$ and $C_{10}$ are preferred. Minor amounts of other fatty acids may be present in the oil as impurities, such as caproic and lauric, but the essential features of the invention constitute the major percentage use of a medium chain fatty acid composition and a minor percentage use of an essential fatty acid such as linoleic and arachidonic acid. The oils may be synthesized in any of the customary methods of the art, such as direct esterification or rearrangement, displacement, etc.

In a further aspect of the invention, the lower fatty acid triglycerides are modified by the glycerides of polyunsaturated higher fatty acids having at least two double bonds. The product may be formed by interesterification of such unsaturated fatty acids and a sufficient amount of glycerine with the triglycerides of said lower fatty acids, In place of the unsaturated fatty acids, oils may be used which have the essential fatty acids present, preferably those in which the polyunsaturated fatty acids constitute at least 40% of the fatty acids present. Typical examples of such oils are safflower, corn, cottonseed and soya bean oils.

Primarily, in practicing the present invention, there is provided a mixture of certain of the fatty acids of coconut type oil, in which the principal acid is caprylic, which constitutes from 65% to 95% of the acid mixture. The amount of caprylic acid is usually at least twice the amount of capric acid, which is normally present in the composition in amounts of about 5% to 35%. There may also be present minor amounts of caproic and lauric acids, the maximum amount thereof being about 5% of the mixture of the acids. Usually the caproic and lauric acids, if present, are in approximately equal amounts with the caproic being present in slightly greater amount than the lauric.

In a modified form of the invention, the saturated fatty acid triglycerides are usually present in amounts of from about 5% to 90% of the total fat which includes the polyunsaturated triglycerides. For some purposes the polyunsaturated triglycerides may be present in amounts of about 5% to 50%. In some compositions the polyunsaturated acids constitute about 0.2% to 5.0% of the total fat.

Any suitable process for making the products may be used. The acids are mixed with the glycerine under conditions such as have long been used in various esterification procedures. The mixture esters, which are substantially neutral triglycerides, may have random distribution.

The products are stable against oxidation, are extremely light in color and even water-white. They have a bland, pleasant odor and flavor and are quite stable. When applied to the skin, they are non-irritating; they soften the skin and are absorbable thereby. They may be used as dispersing agents for oil-soluble organic substances.

In the accompanying drawing constituting a part hereof, the single figure consists of a chart showing a comparison of the results of feeding rats with compositions falling within the present invention and with ordinary fats. The weight of the rats (in grams) is plotted against the length of time on the diet for the various compositions as set forth in the key. The percentages refer to the proportion of the total diet represented by the fatty composition in each case.

In another phase of the invention, applicants have utilized the prior knowledge of the manner in which the digestive system operates. Since there are two pathways for the absorption of fats, and since there are many cases of malabsorption syndromes where the normal fat absorption pathway has been blocked or injured, applicants have discovered a new, novel and practical way to overcome these difficulties by utilizing the alternate pathway for fat absorption. In order to use this alternate pathway, applicants have utilized tailor made fats of specific composition and chain length.

Investigators having patients of specific forms of malabsorption used the tailor made fats of the types mentioned above, as a means of treating their patients' conditions. In all these cases of malabsorption syndromes the patients have responded to the use of the tailor made fat. It is believed that not only does the use of such tailor made fats help to alleviate the direct malabsorption cases, but materially facilitates the assimilation and digestion of fats for people suffering from related ills such as celiac disease, cystic fibrosis and like conditions.

Compositions for the practice of the therapeutic phase of the invention consist essentially of the lower medium chain fatty acids, but as used, they are usually in the form of their esters, and more commonly as the triglycerides. Since $C_{12}$ acid (lauric acid) appears to be the break off point between the absorption of fats and/or fatty acids through the gut, then any tailor made fat or oil having $C_6$ to $C_{12}$ acids in its composition can be utilized for the portal vein absorption. Preferably $C_8$ and $C_{10}$ acids should be used.

Preferably the mixture of acids is of those having 6, 8 and 10 carbon atoms. Usually $C_8$ predominates, and it may be present almost pure and the sum of $C_8$ and $C_{10}$ is usually over 90% of the mixture. Since $C_{12}$ is of marginal value, it does not constitute over 10% of the mixture of acids. Suitable compositions are described in the specific examples below.

The alcohol too may be varied. Mono, di, tri and polyhydric alcohols such as ethyl alcohol, propylene glycol, and glycerine, can be used as the alcohol which esterifies the fatty acids being considered. Mixed or rearranged esters can also be used since this in no way alters their absorption pattern. If the ester is absorbable via the portal vein, then it falls in the scope of this invention. Mono-, di-, and tri-glycerides of said acids are preferable.

The basic invention broadly includes and recognizes the problem of eliminating the obstacles of absorption of fat by utilizing the absorption via the portal vein. For some specific purposes we may include some higher fatty acids along with the fats. The intersolubility of the fats and fatty acids in each other may well enable the homogeneous product to be administered to the patient and even facilitate its absorption. In some cases essential fatty acids, such as linoleic acid, may be included in the tailor made fat of $C_6$ to $C_{12}$ acids in order to overcome essential fatty acid deficiency. Of course, when the concentration of any $C_{14}$ and higher carbon chain length acid increases then the fatty acid is not utilized and will be eliminated.

Treatment with the present method has shown highly favorable results. They act as solvents for certain vitamins and facilitate absorption thereof. Since the new fats are absorbed through the portal system and utilized, the strain on the intestines in digestion is greatly reduced. This is of special significance where surgery has removed some intestinal structures. It is also of value in cases of pancreas damage and not enough of pancreasis is produced to effect normal digestion.

In cases of malabsorption, if fats are eliminated from the diet, then other functions of the body degenerate; by the present treatment diarrhea has been controlled, and patients have gained weight.

The efficacy of the present treatment has been shown in a number of clinical cases. A patient suffering from filariasis induced chyluria, after 32 days of treatment, became free of fat in urine and the hematuria ceased. A patient suffering from hyperlipemia was treated with the present composition and the high lipid content of the plasma disappeared. A patient suffering from pancreatogenous steatorrhea was similarly treated, whereby the condition disappeared. Similarly, lymphatic obstruction and protein leakage was relieved in a patient. Patients with fat malabsorption due to carcinoma of the gall bladder; congenital lymphedema and chylous ascites; enteropathy, steatorrhea and under-nutrition; or cystic fibrosis coupled with fat malabsorption; were similarly treated with the present composition and in all cases the symptoms of fat malabsorption were alleviated.

The following are specific examples of the operation of the present invention.

Example 1

194 parts by weight of glycerine are mixed with 9900 parts of fatty acids, constituting a 10% excess over that necessary to combine with the glycerine to form a triglyceride composition. The fatty acids are in the following proportions by weight:

Caproic ---------------------------------- 1.7
Caprylic ---------------------------------- 72.0
Capric ---------------------------------- 26.2

The mixture is agitated mechanically and a blanket of nitrogen is applied to the reaction vessel. Heat is applied and when the temperature reaches 140° C., water distills off and the temperature is gradually raised to a maximum of about 250° C. at the end of 11 hours. In the last 3 hours, a vacuum is applied to the extent of 6 to 10 mm. pressure.

The product (No. 1400) is refined with sodium hydroxide solution in a manner well known in the art. It is washed, dried, bleached and vacuum filtered. The free fatty acid value of the product is .06 calculated as oleic acid.

Example 2

A mixture is made of 0.6 mol. of glycerine and 2.1 mols. of fatty acids of the following composition by weight:

| | |
|---|---|
| Caproic | 0.8 |
| Caprylic | 68.9 |
| Capric | 29.3 |
| Lauric | 1.0 |

A small amount of zinc dust is introduced as a catalyst, agitation is applied and a blanket of nitrogen is provided on the reaction vessel. The reaction mass is heated over a period of 2½ hours from 145° C. to a maximum of about 245° C. at the end of the operation. Water vapor is removed as it is formed and towards the end of the operation, a vacuum is applied to the reaction vessel.

The product is alkali refined, washed, dried, bleached and filtered. It has a setting point of −6° C.

Example 3

A mixture is made of 194 parts of glycerine by weight with 9900 parts of a fatty acid mixture of the following composition:

| | |
|---|---|
| Caprylic | 91.9 |
| Capric | 8.1 |
| Caproic | Trace |

Zinc dust is added as a catalyst and the reaction vessel is heated up to a temperature of 260° C. over a period of about 8 hours. Water is removed in the vapor state as it is formed.

Generally, the products described above have the following characteristics:

| | |
|---|---|
| Color (Lovibond) | 10 Yellow; 1.0 Red max. |
| Free fatty acid (as oleic) | 0.05%. |
| Iodine value | 5 max. |
| Sp. gr. at 120° F. | 0.9170. |
| Refractive index at 60° C. | 1.4352. |
| Setting point | Below −5° C. |
| Moisture | 0.1 max. |
| Kreis Test (perox. rancid) | Negative. |
| Swift stability (oxid.) | 150 hours plus. |
| Solubility | In 95% ethyl alcohol (infinite). |

The tri-glyceride may be prepared with or without the use of a catalyst. In many cases the resulting product has random distribution of the esters, but where certain conditions or catalysts are used, the product may not have random distribution; in such event, if the product is interesterified with the use of sodium methylate or the like as a promotor, random distribution is obtained. Generally the setting point will be lowered; for example, a product having a setting point of −6° C. before interesterification had a setting point of −12° C. after interesterification.

Example 4

As a dietetic food, the present oils have been found to be of substantial value. The oils may be added to foods in amount up to 40–50% of the mixture, or the foods may be fried in said oils. They have been shown to be valuable in supplying energy without the tendency to deposit in the body, since they are readily oxidized.

Example 5

A mixture is made of the product of Example 1 and of ordinary lard in equal proportions. A suitable catalyst such as sodium methylate is added thereto and the mass heated by well-known procedures until interesterification has taken place. The products are refined, bleached, dried and deodorized.

Such a product is much more acceptable nutritionally both from the standpoint of controlling obesity and that of cholesterol deposition in the system than the original lard.

Example 6

A mixture is made which contains 90% of the oil of Example 1 and 10% of safflower oil. A very small amount, say .2% of sodium methylate solution in methanol is introduced. The mass is held at a temperature of 80° to 85° C. for about one hour. The product (BB-5633) is washed with water until it is substantially neutral and it is then bleached, dried and filtered. Thereafter, it is deodorized by steam for about three hours at a high-vacuum in the presence of nitrogen.

Example 7

A mixture is made of 75% of the oil of Example 1 and 25% of safflower oil, to which a small amount of a solution of sodium methylate in methyl alcohol is introduced. The mixture is maintained at 70° to 80° C. for one hour to cause interesterification to take place (BB-5634). It is then washed with water until it is substantially neutral, is bleached, dried and filtered. Steam deodorization is conducted for about 3½ hours at a high vacuum.

In the following examples, the procedure in producing the synthetic fat is approximately the same as that used in the previously described examples and is in accordance with well-known procedure in the art of interesterification. These examples are as follows:

Example 8

| | Parts |
|---|---|
| Capric-caprylic glyceride | 80 |
| Cod liver oil | 20 |

Example 9

| | |
|---|---|
| Glyceryl tricaprylate | 85 |
| Linseed oil | 15 |

Example 10

| | |
|---|---|
| Product of Example 1 | 100 |
| Linseed fatty acids | 30 |

Example 11

| | |
|---|---|
| Coconut oil | 45 |
| Product of Example 1 | 45 |
| Safflower oil | 10 |

Example 12

Glycerine (sufficient to form triglycerides).

| | |
|---|---|
| Linoleic acid | 100 |
| Capric acid | 36 |
| Caprylic acid | 64 |

Example 13

Glycerine (sufficient to form triglycerides).

| | |
|---|---|
| Linoleic acid ⎫<br>Linolenic acid ⎬ | 100 |
| Capric acid | 10 |
| Butyric acid | 3 |

Example 14

Glycerine (sufficient to form triglycerides).

| | |
|---|---|
| Arachidonic acid ⎫<br>Linolenic acid ⎬ | 100 |
| Capric acid | 30 |
| Caproic acid | 1.5 |

Example 15

The following composition was prepared by physically mixing the components in the proportions hereinafter indicated.

| | Parts |
|---|---|
| Corn oil | 40 |
| Product of Example 1 | 75 |

In Examples 12, 13 and 14, the relative proportions of the acids used may be varied considerably depending upon the characteristics desired in the final oil and arachidonic acid may be substituted for linolenic and linoleic acids with like results.

Comparative tests were made on mice which were fed a normal diet with 20% of the present oils and a diet which contained 20% of lard. Substantially more of the present oils had to be ingested than of lard to maintain the body weight. When the mice were allowed to eat unlimited amounts of these foods, the increase in body weight was at a lower rate with the present oils.

The protective effect of the present oils against toxicity is excellent. In comparative tests, mice were fed with a normal diet containing 20% of the present oils and 10% of auto-oxidized cottonseed oil residues (known to have toxic effects), and also with a similar mixture using 20% of lard instead of the present oils. The mice fed with the present oils were able to eat more and gain more weight, with no toxic effects from the residues. The lard composition was not able to afford this protective effect.

In the accompanying chart, the curves represent comparative feeding tests on rats. They were given a basic diet consisting of 30% casein, 4% salt, 2% alpha-cellulose, 20% fat and 44% dextrose. For comparison purposes, curves showing both lard and fat-free diets are included. Vitamins were added to the diet in required amounts to meet accessory factor requirements. In the five curves in accordance with corresponding examples of the present invention, the lard was completely replaced by the respective synthetic fat. The curves show that the rate of increase of weight was substantially less when the present fats were substituted for the lard. In addition, there did not appear over a period of about one year any deficiency of essential fatty acids in the bodies of the test animals. It has been found that by the use of the present synthetic fats, the requirements for essential fatty acids in the body has been greatly reduced and, therefore, indirectly there is a measure of control over the cholesterol in the system. It has also been found that the cholesterol deposition in the system is reduced, which is probably caused in part by the dissolving action of the lower fatty acid glycerides and partly by the retaining of the cholesterol in solution in the lower fatty acid glycerides.

Although the invention has been described setting forth a number of specific examples of the operation of the invention, the invention is not limited thereto but the examples are merely illustrative of the scope of the invention and the large number of compositions which may be made in accordance therewith. In the interesterified oil, the percentages of the several acids used may be varied and the highly unsaturated fatty acids or oils containing them may vary from about 5% to 50% of the entire fatty acid content but preferably the unsaturated acids are incorporated in the lower portion of the range. The procedures used in the several reactions need not be those specifically described but any well known esterification process may be used. The invention is not limited to the use of unsaturated oils specifically named, but any of the well known oils containing more than 40% of the higher unsaturates may be used.

Feeding tests on experimental animals have indicated the effectiveness of the present invention. Tests were conducted with freely eating male rats. Some were fed with a fat free diet as a control; the rats showed a progressive increase in weight up to the end of the test at 20 weeks of age. When the diet included 20% of fat in the form of lard the increase in weight of the test animals was at a greater rate and when 40% of lard was added the weight increase was proportionately greater. On the other hand, when 20% or 40% of the product of Example 1 was added to the diet, the increases in weight were less than even in the case of the fat free diet, while the health of the animals was not adversely affected. Further tests were made on rats by adding 20% of the products of Examples 6 and 7 to the diet, the increase in weight being intermediate to the fat free control and the diet containing the product of Example 1. In still another test, a mixture of the product of Example 1 with 5% linoleic acid was used in the amount of 20%; the rate of increase of weight was somewhat greater than that of Example 1 and less than that of Examples 6 and 7.

We claim:

1. A method of treating human beings suffering from malabsorption of fat which comprises feeding said humans a substantial amount of fatty acids taken from the class consisting essentially of mixtures of acids having from 6 to 12 carbon atoms, said acids being unsubstituted, straight-chain, saturated acids having an even number of carbon atoms, wherein the total amount of $C_6$ and $C_{12}$ acids is not over about 5% by weight of said fatty acids and the weight ratio of $C_8$ to $C_{10}$ acid is at least 2 to 1 and edible esters of said acids with ethyl alcohol, propylene glycol or glycerine.

2. A method according to claim 1 characterized in that said fatty acids are in the form of glyceride esters.

3. A method according to claim 1 characterized in that said fatty acids are in the form of triglycerides.

4. A method according to claim 3 characterized in that the proportions by weight of the acids are:

| | |
|---|---|
| $C_8$ | 65–95 |
| $C_{10}$ | 5–35 |
| $C_6$ and $C_{12}$ | 0–5 |

5. A method according to claim 3 characterized in that the proportions by weight of the acids are:

| | |
|---|---|
| $C_6$ | 0–3 |
| $C_8$ | 65–75 |
| $C_{10}$ | 25–35 |
| $C_{12}$ | 0–2 |

6. The process comprising feeding to a human being a diet, whose fat protein is substantially only a readily absorbable, medicinal and therapeutic triglyceride of a mixture consisting essentially of the following fatty acids in the stated proportions by weight:

| | |
|---|---|
| Caprylic | 65–95 |
| Capric | 5–35 |
| Caproic and lauric | 0–5 |

7. A method for treating a human being suffering from hyperlipemia which comprises feeding said human being a substantial amount of a triglyceride of a mixture consisting essentially of the following fatty acids in the stated proportions by weight:

| | |
|---|---|
| Caprylic | 65–95 |
| Capric | 5–35 |
| Caproic and lauric | 0–5 |

8. A method for treating a human being suffering from chyluria which comprises feeding said human being a substantial amount of a triglyceride of a mixture consisting essentially of the following fatty acids in the stated proportions by weight:

| | |
|---|---|
| Caprylic | 65–95 |
| Capric | 5–35 |
| Caproic and lauric | 0–5 |

9. A method for treating a human being suffering from filariasis which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

10. A method for treating a human being suffering from hepatic glycogenosis which comprises feeding said human being a substantial amount of a triglyceride of a mixture consisting essentially of the following fatty acids in the stated proportions of weight:

Caprylic _____ 65–95
Capric _____ 5–35
Caproic and lauric _____ 0–5

11. A method for treating a human being suffering from elephantiasis which comprises feeding said human being a substantial amount of a triglyceride of a mixture consisting essentially of the following fatty acids in the stated proportions of weight:

Caprylic _____ 65–95
Capric _____ 5–35
Caproic and lauric _____ 0–5

12. A method for treating a human being suffering from chylothorax which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

13. A method for treating a human being suffering from hypercholesterolemia which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

14. A method for treating a human being suffering from pancreatitis which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

15. A method for treating a human being suffering from pancreatogenous steatorrhea which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

16. A method for treating a human being suffering from proteinuria which comprises feeding said human being a substantial amount of a triglyceride of a mixture consisting essentially of the following fatty acids in the stated proportions by weight:

Caprylic _____ 65–95
Capric _____ 5–35
Caproic and lauric _____ 0–5

References Cited

UNITED STATES PATENTS

| | | | |
|---|---|---|---|
| 2,238,442 | 4/1941 | Drew | 167—66 XR |
| 2,808,421 | 10/1957 | Brokaw | 99—118 |
| 2,914,546 | 11/1959 | Barsky et al. | 260—410.7 |
| 2,988,483 | 6/1961 | Barsky et al. | 167—66 |

OTHER REFERENCES

Beveridge et al., Can. J. Biochem. Physiol. vol. 37, pp. 575–582 (1959), 167—66.

Kaunitz et al., J. Amer. Oil Chem. Soc., vol. 35, pp. 10–13, January 1958, 167—66.

Kaunitz et al., J. Amer. Oil Chem. Soc., vol. 36, pp. 322–325, August 1959, 167—66.

Kaunitz et al., J. Nutrition, vol. 71, pp. 400–404, August 1960, 167–66.

Registered Trademark No. 745,196 for MCT to Drew Chemical Corp., February 1963.

RICHARD L. HUFF, *Primary Examiner.*

PO-1050
(5/69)

UNITED STATES PATENT OFFICE
CERTIFICATE OF CORRECTION

Patent No. 3,450,819   Dated June 17, 1969

Inventor(s) V. K. Babayan et al.

It is certified that error appears in the above-identified patent and that said Letters Patent are hereby corrected as shown below:

Column 8, line 46, "protein" should read --portion--.

SIGNED AND
SEALED

DEC 2 - 1969

(SEAL)
Attest:

Edward M. Fletcher, Jr.
Attesting Officer

WILLIAM E. SCHUYLER, JR
Commissioner of Patents